(12) United States Patent
Kirkup et al.

(10) Patent No.: US 7,562,218 B2
(45) Date of Patent: Jul. 14, 2009

(54) METHOD, SYSTEM AND DEVICE FOR AUTHENTICATING A USER

(75) Inventors: Michael G. Kirkup, Waterloo (CA);
Michael K. Brown, Kitchener (CA);
Michael S. Brown, Waterloo (CA); Neil P. Adams, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 896 days.

(21) Appl. No.: 10/919,320

(22) Filed: Aug. 17, 2004

(65) Prior Publication Data
US 2006/0041746 A1    Feb. 23, 2006

(51) Int. Cl.
*H04L 9/00* (2006.01)
(52) U.S. Cl. ................ 713/168; 726/16; 726/20; 713/169; 713/172; 709/248; 380/44
(58) Field of Classification Search ............ 713/168
See application file for complete search history.

(56) References Cited

U.S. PATENT DOCUMENTS

| | | | |
|---|---|---|---|
| 4,720,860 A | 1/1988 | Weiss | |
| 5,475,377 A | 12/1995 | Lee | |
| 5,546,463 A * | 8/1996 | Caputo et al. | 713/159 |
| 7,080,037 B2 * | 7/2006 | Burger et al. | 705/50 |
| 7,134,024 B1 * | 11/2006 | Binding et al. | 713/187 |
| 7,346,778 B1 * | 3/2008 | Guiter et al. | 713/182 |
| 2002/0078362 A1 | 6/2002 | Matsui | |
| 2002/0095588 A1 * | 7/2002 | Shigematsu et al. | 713/186 |
| 2002/0097876 A1 | 7/2002 | Harrison | |
| 2002/0099665 A1 * | 7/2002 | Burger et al. | 705/67 |
| 2003/0046567 A1 | 3/2003 | Carman | |
| 2003/0115473 A1 * | 6/2003 | Sugimura et al. | 713/186 |
| 2003/0130957 A1 | 7/2003 | Best et al. | |
| 2003/0191949 A1 * | 10/2003 | Odagawa | 713/186 |

FOREIGN PATENT DOCUMENTS

| | | |
|---|---|---|
| GB | 2 181 582 | 4/1987 |
| WO | WO 00/31608 | 6/2000 |

(Continued)

OTHER PUBLICATIONS

Sahakriya, "SecureSignin Two Factor Authentication", Sahakriya, 2007, entire document, http://www.sahakriya.com/sahakriya2fa.pdf.*

(Continued)

*Primary Examiner*—Kambiz Zand
*Assistant Examiner*—Ronald Baum
(74) *Attorney, Agent, or Firm*—Bereskin & Parr LLP/S.E.N.C.R.L., s.r.l.

(57) ABSTRACT

Preferred embodiments of the invention relate to a method and device for authenticating a user of a computer and a corresponding system using the method and device. The device is a handheld electronic device having accessible thereto a first authentication code of the user. The handheld electronic device requires a second authentication code for enabling use thereof. In order to authenticate the user to the computer, the handheld electronic device is configured to transmit the first authentication code to the computer over a communication link between the computer and the handheld electronic device.

33 Claims, 4 Drawing Sheets

FOREIGN PATENT DOCUMENTS

| | | |
|---|---|---|
| WO | WO 00/48064 | 8/2000 |
| WO | WO 03/069476 | 8/2003 |

OTHER PUBLICATIONS

Summons to attend Oral Proceedings, European Patent Application No. 04019475.5, Oct. 19, 2007.

EP Examination Report on corresponding European Application No. 04 019 475.5, Jul. 27, 2006.

European Search and Examination Report. Application No. 08152552.9. Dated: July 9, 2008.

Co-pending U.S. Appl. No. 10/945,950, "Apparatus and Method for Integrating Authentication Protocols in the Establishment of Connections Between Computing Devices", Filed Sep. 22, 2004. (Retrievable from PAIR).

Request for Continued Examination and Information Disclosure Statement. U.S. Appl. No. 10/945,950. Dated: Aug. 7, 2008. (Retrieved from PAIR).

Notice of Allowance and Fee(s) Due. U.S. Appl. No. 10/945,950. Dated: Jul. 23, 2008. (Retrieved from PAIR).

Amendment. U.S. Appl. No. 10/945,950. Dated: Jun. 4, 2008. (Retrieved from PAIR).

United States Office Action. U.S. Appl. No. 10/945,950. Dated: Feb. 4, 2008. (Retrieved from PAIR).

Decision from European Patent Office dated Apr. 29, 2008, European Patent Application No. 04019475.5.

US 5,373,559, 12/1994, Kaufman et al. (withdrawn)

\* cited by examiner

METHOD, SYSTEM AND DEVICE FOR AUTHENTICATING A USER

FIELD OF THE INVENTION

The invention relates generally to methods, systems and devices for authenticating a user of a computer by using a handheld electronic device.

BACKGROUND OF THE INVENTION

Currently, some organizations require their personnel to authenticate themselves by use of a smart-card in order to gain access to a computer within the organization. Further, some of these organizations require that any handheld electronic devices used by the personnel in addition to a desktop computer be subject to similar authentication requirements. Thus, the smart-card may be required to unlock the desktop computer as well as the handheld electronic device.

Commonly, once the smart-card is removed from the card reader associated with the desktop computer or handheld electronic device, the computer or handheld electronic device becomes locked. Thus, if a user wishes to unlock his desktop computer upon entering his office, he can withdraw his smart-card from his handheld electronic device and place it in a card reader associated with the desktop computer. However, withdrawal of the smart-card from the handheld electronic device may cause it to be locked, thus preventing the user from accessing his handheld electronic device at the same time as accessing his desktop computer.

It is desired to address or ameliorate one or more drawbacks or disadvantages associated with existing ways of authenticating a user of a computer.

SUMMARY OF THE INVENTION

One aspect of the invention relates to a method of authenticating a user of a computer, comprising:

providing a handheld electronic device having accessible thereto a first authentication code of the user, the handheld electronic device requiring a second authentication code for use thereof; and transmitting the first authentication code from the handheld electronic device to the computer over a communication link therebetween to authenticate the user.

In one embodiment, the first authentication code is stored on a smart-card received by the handheld electronic device. In an alternative embodiment, the first authentication code is stored in a memory of the handheld electronic device. In a further alternative embodiment, the first authentication code is stored in a subscriber identity module (SIM) card received by the handheld electronic device.

Another aspect of the invention relates to a handheld electronic device having:

a first authentication code stored on a memory accessible by the handheld electronic device;

means for receiving a second authentication code of the user;

communication means for communicating between the handheld electronic device and a computer; and processor means configured to authenticate the second authentication code and provide the first authentication code to the computer via the communication means to authenticate the user.

Provision of the first authentication code may be in immediate response to, or some time after, authentication of the second authentication code.

A further aspect of the invention relates to computer readable storage having stored thereon computer program instructions which, when executed by a computer processor of a handheld electronic device, cause the handheld electronic device to perform a method for authenticating a user of a computer, wherein the handheld electronic device has an authentication code accessible thereto and the method comprises:

receiving a personal identification code of the user;

authenticating the personal identification code;

establishing a communication link between the handheld electronic device and the computer; and providing the authentication code for the handheld electronic device to the computer over the communication link to authenticate the user.

A further aspect of the invention relates to a system for authenticating a user of a computer comprising:

a handheld electronic device having an authentication code accessible thereto and means for receiving a personal identification code of the user; and a communication link between the handheld electronic device and the computer;

wherein the handheld electronic device is configured to receive the personal identification code, authenticate the personal identification code and provide the authentication code to the computer over the communication link to authenticate the user.

In one embodiment of this aspect, the means for receiving comprises a user interface of the handheld electronic device.

In another embodiment of this aspect, the means for receiving comprises a communication port of the handheld electronic device and the personal identification code is received from the personal computer over the communication link.

Another aspect the invention relates to a method for authenticating a user of a personal computer by provision of an authentication code to the personal computer, the method comprising:

providing a handheld electronic device having the authentication code accessible thereto receiving an identification code of the user;

authenticating the identification code;

accessing the authentication code based on the authenticated identification code;

establishing a communication link between the handheld electronic device and the personal computer; and providing the authentication code from the handheld electronic device to the personal computer over the communication link to authenticate the user.

DETAILED DESCRIPTION OF EMBODIMENTS OF THE INVENTION

Embodiments of the invention generally relate to authenticating a user of a computer using a handheld electronic device having an authentication code stored thereon or otherwise accessible thereto. The handheld electronic device is configured to transmit the authentication code to the computer so as to enable the user to unlock the desktop of the computer and thus gain access to the computer functions.

Advantageously, arrangements of the handheld electronic device and the computer may be such that if the handheld electronic device is itself unlocked, the user need do nothing more than enable it to communicate with the computer, in order to unlock the computer also. This requires that the handheld electronic device store, or have access to, an authentication code suitable for authenticating the user's identity to the computer.

Alternatively, if greater security is desired, the handheld electronic device can be configured to require entry of a user code, such as a personal identification number (PIN) or other form of authorization, to initiate release of the authentication code for transmission to the computer. Thus, for example, where the smart-card is received in a slot of the handheld electronic device (which effectively acts like a smart-card reader), the user is authenticated to the handheld electronic device by the smart-card received therein and becomes authenticated to the computer once the handheld electronic device transmits the authentication code read from the smart-card to the computer. Alternative arrangements, involving different levels of security and physical set-ups can be employed and some of these are described below in relation to the drawings.

Figure 1A:
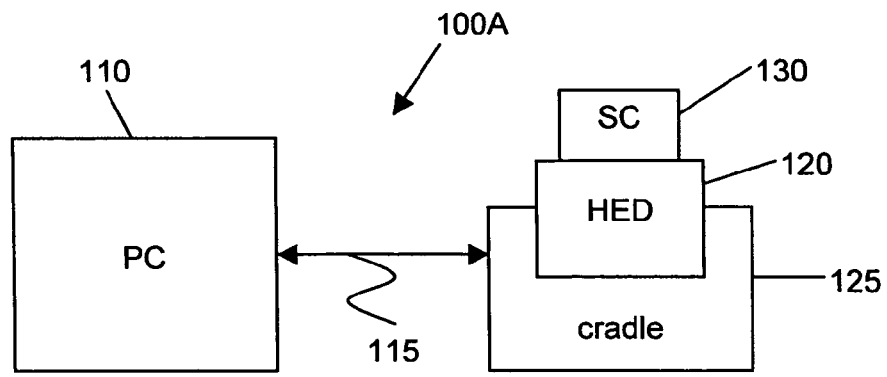
FIG. 1A is a block diagram of a system for authenticating a user of a computer, according to one embodiment for the invention.
Figure 3:
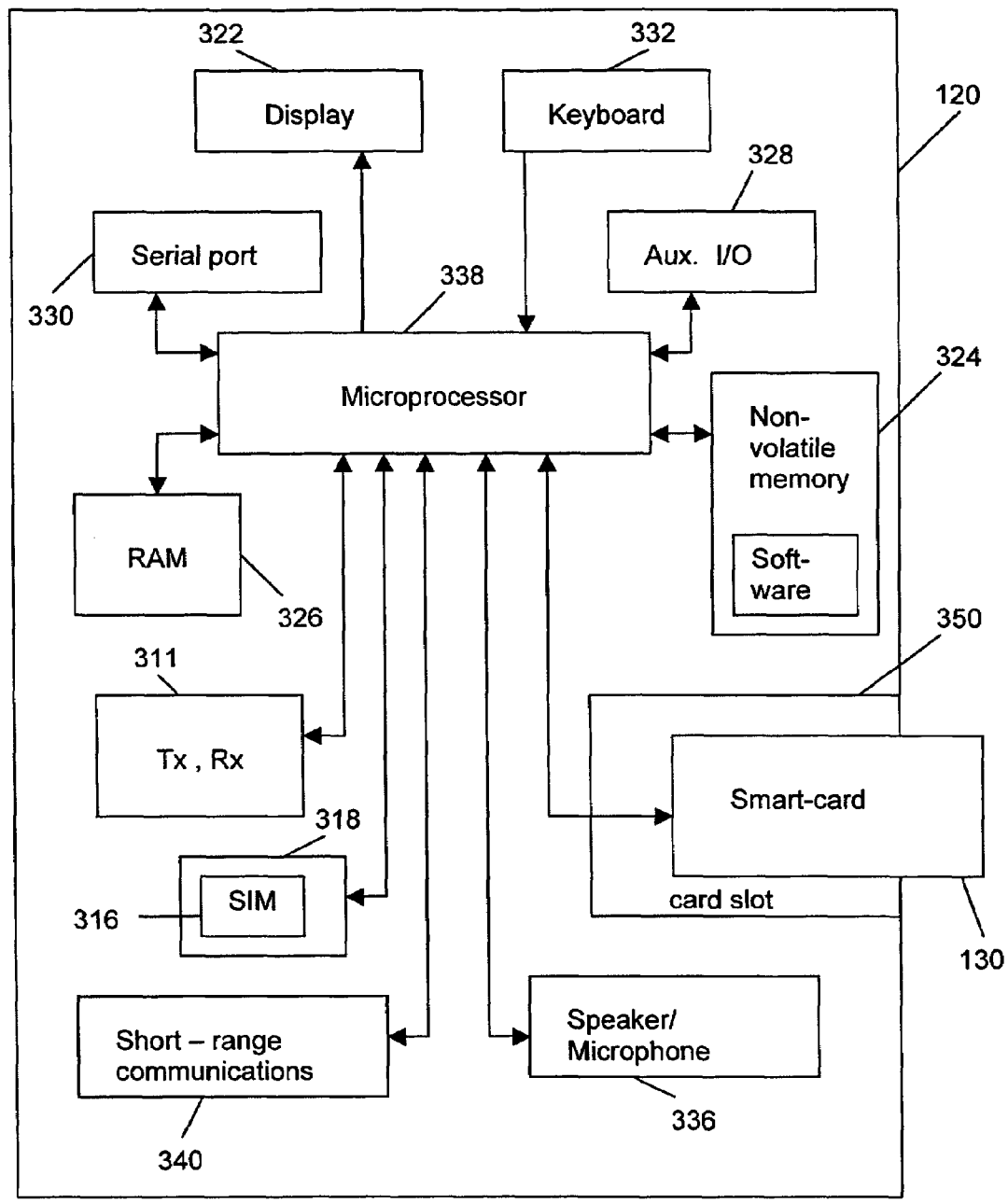
FIG. 3 is a block diagram of a handheld electronic device for use in authenticating a user, according to another embodiment of the invention.

Referring now to FIG. 1A, there is shown a system 100A for authenticating a user of a computer, according to one embodiment of the invention. The system 100A includes a handheld electronic device (HED) 120 in communication with a personal computer (PC) 110 through a communication link 115. The handheld electronic device 120 has a smart-card (SC) 130 received in a smart-card slot (for example, such as is shown in FIG. 3 and designated by reference numeral 350). The handheld electronic device 120 is received in a cradle 125, which in turn connects to communication link 115 through internal electrical connections (not shown) in the cradle 125.

The communication link 115 is preferably established through a suitable connection cable (not specifically shown) for serial communication between a serial port (not shown) of the PC 110 and a serial port (shown in FIG. 3 and designated by reference numeral 330) of the handheld electronic device 120 (via cradle 125). The connection cable may be a Universal Serial Bus (USB) cable, for example.

The handheld electronic device may be a dual mode (data and voice) communication device and personal digital assistant device, such as is described in further detail below in relation to FIG. 3. Alternatively, the handheld electronic device may be a single mode (data) communication device. The handheld electronic device 120 requires the user to authenticate himself/herself by providing a password or PIN code to unlock the user interface of the handheld electronic device 120 and enable use thereof.

The handheld electronic device 120 has electrical contacts (not shown) exposed on an outer casing thereof for forming an electrical connection with corresponding contacts located on cradle 125. The electrical contacts on cradle 125 are electrically connected to a fixed or removably connectable cable to form communication link 115.

PC 110 may be of any kind of computer, such as a normal desktop computer, laptop or other portable or fixed computer system which may require authentication of the user identity prior to enabling use thereof. Accordingly, while the computer is described as a PC 110, it should be understood that it need not be a personal computer or be of a particular type. Likewise, performance of the invention can be achieved whether the computer runs a Windows based operating system, Unix based operating system or other type of operating system.

PC 110 includes normal peripherals such as a display screen, a keyboard, mouse, etc. for enabling user interaction therewith. Thus, for example, when the user wishes to use PC 110, he or she may perform an activation action, such as typing on the keyboard or moving the mouse, whereupon the user may be requested to provide a user identification code (either to the PC 110 or the handheld electronic device 120) to unlock the PC desktop and enable use thereof. The user identification code, which may be a PIN code or another code, is compared with a stored access code and, if the user identification code is valid, the authentication code stored on the smart-card is accessed and provided to PC 110.

PC 110 is preferably configured to automatically seek the authentication code from handheld electronic device 120 over communication link 115 in response to activation. Depending on the configuration of the handheld electronic device 120, receipt of a communication from PC 110 may trigger automatic retrieval of the authentication code from smart-card 130 or it may cause the handheld electronic device 120 to request user authentication before retrieving the authentication code and communicating it to PC 110 (or authorization). Alternatively, PC 110 may simply await input of the authentication code from handheld electronic device 120 over communication link 115.

The communication protocol used between the PC 110 and the handheld electronic device 120 depends on the form of connection established therebetween. Example connections include a serial connection, a USB connection and a Bluetooth connection. Other suitable communication protocols may employed instead.

Generally, embodiments which require the user to positively authorize release of the authentication code from the smart-card involve user input into the user interface of the handheld electronic device 120. However, in an alternative embodiment, PC 110 may be configured to request the user to enter an authentication code for the handheld electronic device 120, for example where the PC 110 has detected the presence of handheld electronic device 120 through communication link 115.

Once the user enters the authentication code of the handheld electronic device 120 through PC 110, this is transmitted to the handheld electronic device 120 by communication link 115 for authentication. If the entered authentication code is correct, the handheld electronic device 120 then provides the authentication code for the PC 110 (as extracted from smart-card 130) across communication link 115, thereby authenticating the user and unlocking the desktop of PC 110.

Advantageously, the described arrangements generally allow a user to unlock both the PC 110 and the handheld electronic device 120 by simply inputting one authorization code, namely that for the handheld electronic device 120. Advantageously, the PIN code or other unlocking code for the handheld electronic device 120 may be entered either into a user interface of the handheld electronic device 120 or that of the PC 110 so as to unlock handheld electronic device 120 (if it is not already unlocked) and PC 110. If the PIN code or other unlocking code for the handheld electronic device 120 is entered into PC 110, the PC 110 communicates with handheld electronic device 120 to retrieve the necessary authentication code from smart-card 130. Otherwise, if the user interfaces directly with handheld electronic device 120 then, upon authentication of the user (if required), the authentication code for PC 110 is extracted from smart-card 130 and provided to PC 110 over communication link 115.

The user identification code may be a PIN code or may be an alphanumeric or alphabetic password, for example. Depending on the configuration of the handheld electronic device 120, the user may be required to input the password in order to unlock the user interface of the handheld electronic device 120, and subsequently input the PIN code in order to authorize access to the authentication code stored on the smart-card. Alternatively, once the handheld electronic device 120 is unlocked by entry of an appropriate PIN code or password, it may be configured to not require subsequent entry of any further user identification code in order to access the authentication code on the smart-card.

If the handheld electronic device 120 is configured so as to require entry of a user identification code prior to enabling access to the authentication code on the smart-card, the user identification code thus required may be set so as to be the same code as that required for unlocking the handheld electronic device 120, so that the user does not have to remember separate codes.

If a user identification code is required to enable access to the authentication code on the smart-card, then upon receipt of the user identification code, it is compared with an appropriate access code stored on the smart-card. The access code is compared with the inputted user identification code and, if they match, the user identity is effectively authenticated to the smart-card, which then enables access of the authentication code for transmission thereof to the computer.

Where the handheld electronic device 120 is configured so as not to require entry of a user identification code prior to access of the authentication code on the smart-card, the authentication code may be provided to the PC 110 automatically upon establishment of communication link 115 or in response to a simple authorization action performed by the user. For example, the authorization action may be responding "yes" or "ok" to a question in a dialog box on the user interface asking "ok to provide authorization code?". While such an authorization action by the user provides more security than allowing automatic access to the authorization code on the smart-card, it is not as secure as providing a proper user identification code, such as a PIN code or password.

Figure 1B:
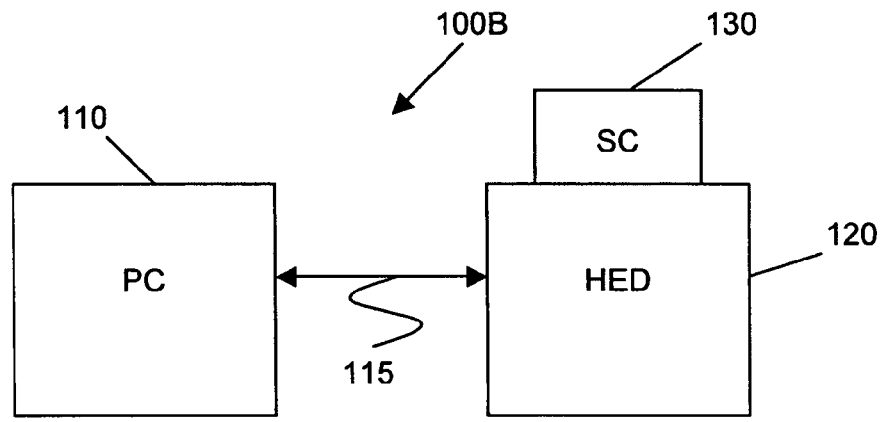
FIG. 1B is a block diagram of a system for authenticating a user of a computer, according to another embodiment of the invention.

Referring now to FIG. 1B, an alternative embodiment of the invention is shown, in the form of system 100B. System 100B is similar to system 100A, except that it does not require a cradle 125. Rather, in system 100B, PC 110 and handheld electronic device 120 are directly connected through communication link 115, for example by a communication cable connecting respective serial input/output (I/O) ports of PC 110 and handheld electronic device 120. Apart from the absence of cradle 125, system 100B otherwise operates in a similar manner to system 100A, as described in relation to FIG. 1A.

Figure 1C:
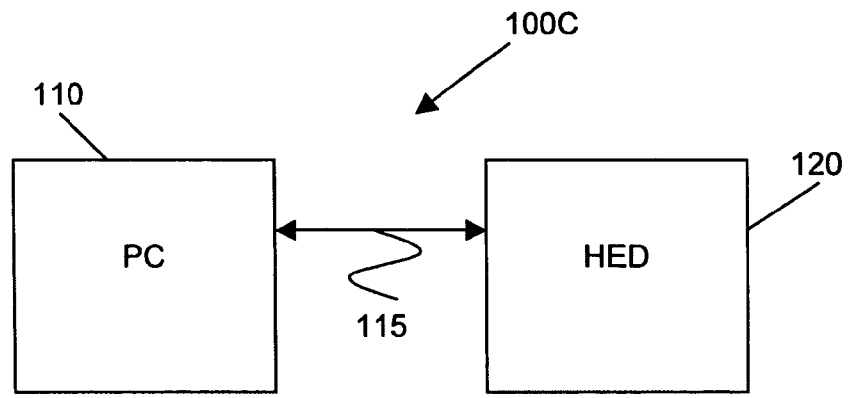
FIG. 1C is a block diagram of a system for authenticating a user of a computer, according to another embodiment of the invention.

Referring now to FIG. 1C, a further alternative embodiment of the invention is shown, in the form of system 100C. System 100C is similar to system 100A and system 100B, except that it does not have a separate smart-card received in a slot of the handheld electronic device 120. Instead, the handheld electronic device 120 includes a subscriber identity module (SIM) card (shown in FIG. 3 and designated by reference numeral 316), such as those which are commonly used in the Global System for Mobile Communication (GSM) and General Packet Radio Services (GPRS) telecommunication standards. The SIM card is thus a form of smart-card, having an authentication code stored thereon for authenticating a user's identity to the network or as otherwise required.

The SIM card is received within the handheld electronic device in a fixed, but removable, manner and thus system 100C does not require a slot in the handheld electronic device 120 for receiving smart-card 130, nor does it require use of a cradle 125. As with system 100B, PC 110 and handheld electronic device 120 are directly connected through communication link 115, for example by a communication cable connecting the serial I/O ports of PC 110 and handheld electronic device 120. Apart from the differences noted, system 100C otherwise operates as described in relation to systems 100A, 100B, FIG. 1A and FIG. 1B.

In an alternative embodiment of system 100C, instead of a SIM card disposed in the handheld electronic device 120, a non-volatile memory of the handheld electronic device 120 may be used to store the authentication code of the user. This may be appropriate where the handheld electronic device is not compatible with the GSM or GPRS standards and is thus not suited to use with a SIM card. The non-volatile memory used to store the authentication code should be suitably secure so as to prevent unauthorized access thereto.

Figure 1D:
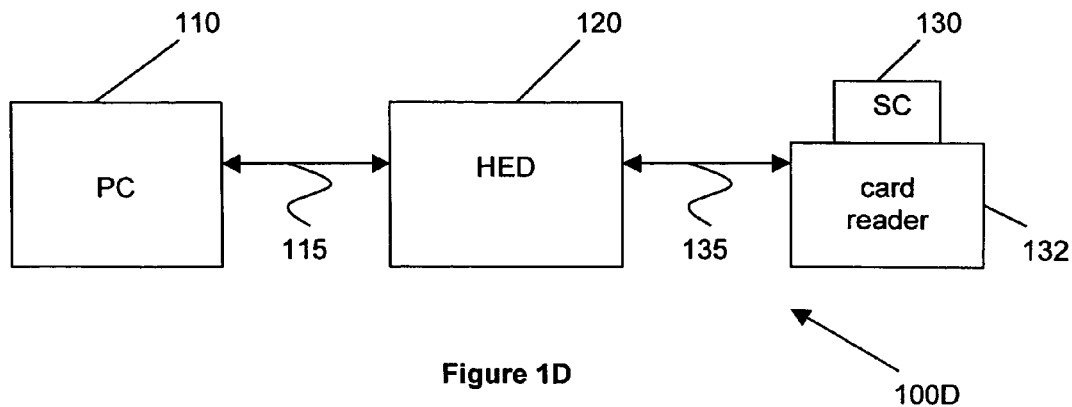
FIG. 1D is a block diagram of a system for authenticating a user of a computer, according to another embodiment of the invention.

Referring now to FIG. 1D, a further alternative embodiment of the invention is shown, in the form of system 100D. System 100D is similar to system 100A, except that it does not require the handheld electronic device 120 to be received in cradle 125. Rather, in system 100D, a smart-card reader 132 may directly receive smart-card 130 and the handheld electronic device 120 communicates with the smart-card reader 132 over a communication link 135 to access the authentication code stored in the memory of smart-card 130.

Communication link 135 may be established through a suitable cable interconnecting smart-card reader 132 and an auxiliary input/output port (such as is shown in FIG. 3 and designated by reference numeral 328) of handheld electronic device 120.

Communication link 115 in system 100D is formed in the same way as described in relation to systems 100B and 100C. System 100D is different from system 100A in that the card reading function of smart-card 130 is not performed by the handheld electronic device 120, but is instead performed by card reader 132 as a separate component of system 100D.

System 100D further differs from system 100A in that it employs a direct communication link between PC 110 and handheld electronic device 120, rather than indirectly through cradle 125. Apart from the noted differences, system 100D otherwise operates in a similar manner to system 100A, as described in relation to FIG. 1A.

Figure 1E:
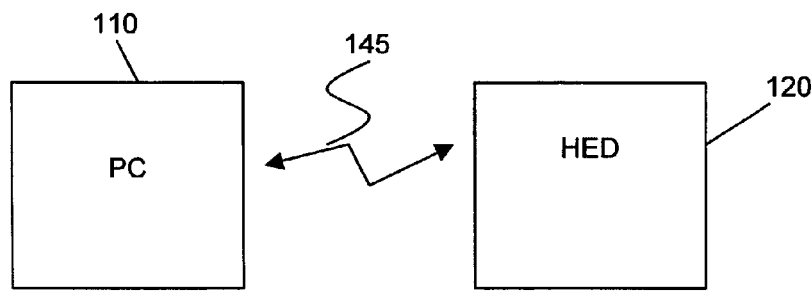
FIG. 1E is a block diagram of a system for authenticating a user of a computer, according to another embodiment of the invention.

Referring now to FIG. 1E, a further alternative embodiment of the invention is shown, in the form of system 100E. System 100E is similar to system 100C, except that communication link 115 is replaced by a wireless communication link 145 between PC 110 and handheld electronic device 120.

Wireless communication link 145 may, for example, be established by infrared communications or short-range radio frequency communications, such as those specified by the Bluetooth or 802.11 standards. Such wireless communications require PC 110 to have corresponding hardware input/output functionality and software for executing that communication functionality. Other short-range wireless communications media and/or protocols may be used to provide communication link 145.

Wireless communication link 145 may be employed in place of communication link 115 in any of the embodiments of systems 100A, 100B, 100C, 100D and 100F (described hereinafter). Advantageously, providing wireless communication link 145 enables a user to approach PC 110, activate the PC 110 and have it communicate automatically and wirelessly, for example using the Bluetooth short-range communication specification, with handheld electronic device 120 to access the user's authentication code (stored on the smart-card, SIM card or memory of the handheld electronic device) and authenticate the user. This example is particularly applicable to systems embodiments 100B and 100C (if using wireless communication link 145) and 100E, where the user is not required to provide a user identification code to release the authentication code (i.e. because the handheld electronic device has already received such a code and is already unlocked).

Figure 1F:
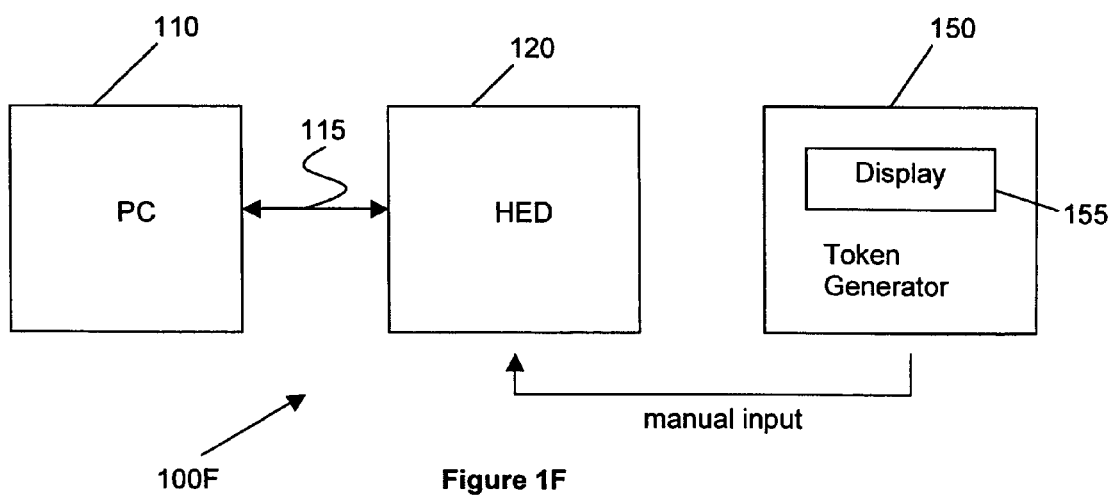
FIG. 1F is a block diagram of a system for authenticating a user of a computer, according to another embodiment of the invention.

Referring now to FIG. 1F, a further alternative embodiment of the invention is shown, in the form of system 100F. System 100F is similar to system 100C, except that it involves a separate token generator 150 (for example, such as a SecurID Authenticator by RSA) and handheld electronic device 120 in system 100F includes a software module for authenticating a user identification code generated by the token generator 150. System 100F involves the use of token generator 150 to generate a secure identification token based on an objective criterion (such as the time or date, for example). The token thus generated is displayed on display 155 of token generator 150 for the user to read.

In order for the user to enable the authentication code to be provided to PC 110, the user must enter the token displayed on token generator 150 into handheld electronic device 120. Handheld electronic device 120 has software to generate an access code using the same algorithms used by token generator 150 to generate the token, and compares the access code to the user identification code (i.e. the generated token) input by the user. If the access code generated by the handheld electronic device 120 matches the manually inputted token, the authentication code becomes accessible for communication to PC 110.

The use of token generator 150 may be applied in relation to any of systems 100A to 100E as a secure means for authenticating the user to the handheld electronic device 120, where the memory accessible thereto has the authentication code. Apart from the use of token generator 150 for providing the user identification code, system 100F otherwise operates in a similar manner to any of systems 100A to 100E, as described in relation to FIGS. 1A to 1E.

In an alternative embodiment (not shown), similar to system 100F, the function of token generator 150 may be incorporated into handheld electronic device 120 and, instead of the user manually inputting the token into handheld electronic device 120, the token is automatically generated by the handheld electronic device 120 as an authentication code in response to an authenticated user identification code. The token generated in this way is then transmitted to PC 110 over communication link 115 (or 145) for comparison with a token generated locally on PC 110 according to the same algorithm and objective criterion used to generate the token on handheld electronic device 120.

Thus, the secure token generator may be used by the user to authenticate the user to the handheld electronic device 120 or by the handheld electronic device 120 to authenticate itself to PC 110, using an encrypted token.

Each of the embodiments, and variations thereof, of systems for authenticating a user described above is generally related by the provision of a handheld electronic device 120 having an authentication code accessible thereto. When the authentication code is provided to PC 110 over a communication link 115 or 145, the user can be authenticated as an authorized user of the PC 110. It should be understood that such functional requirements can be achieved in a number of ways, at least some of which have been described. Further embodiments of the invention may be arrived at through combinations of features or functions described in relation to the various embodiments, and all such combinations are, if useful, within the scope of the invention.

Figure 2:
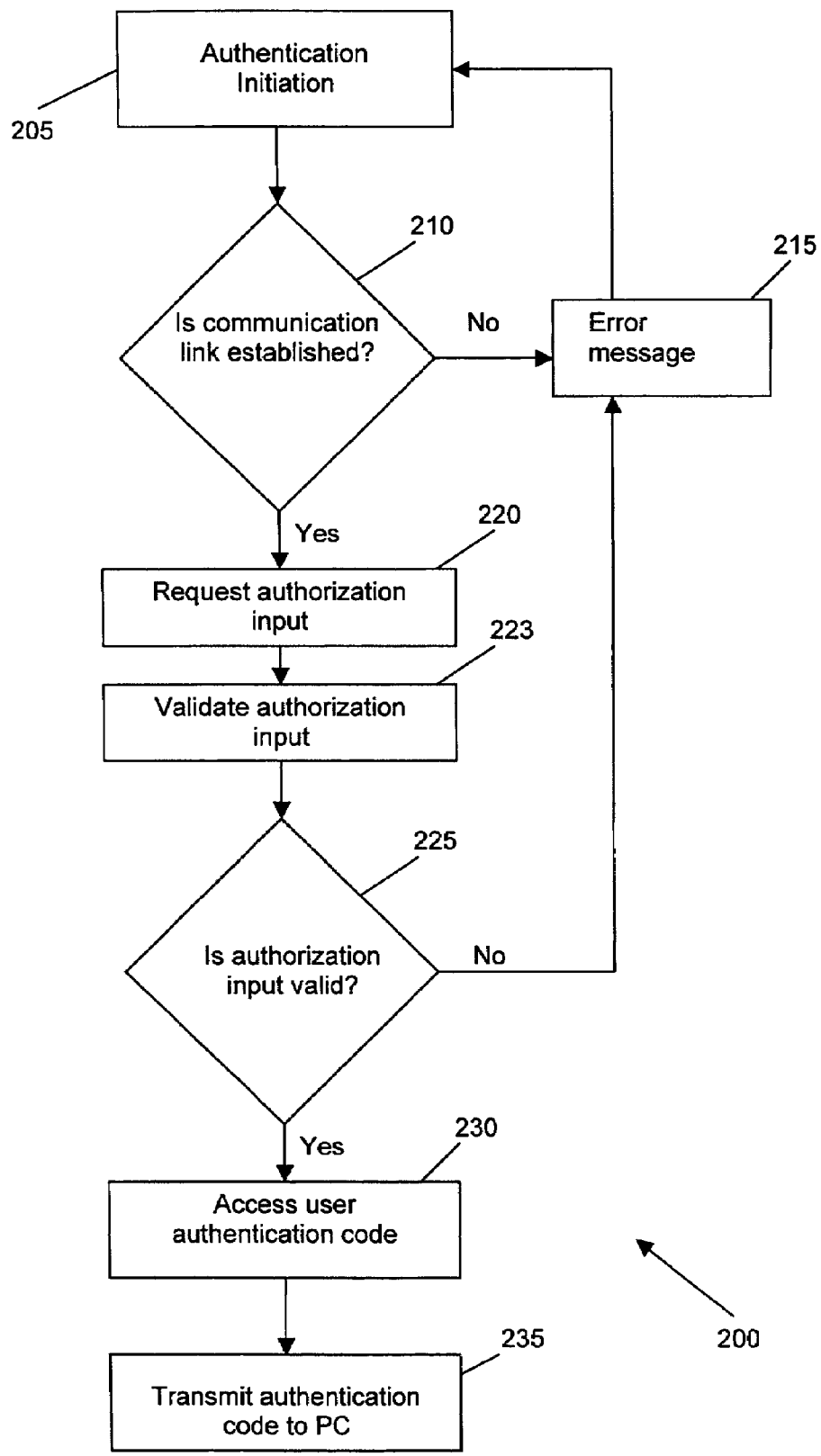
FIG. 2 is a process flow diagram illustrating a method of authenticating a user of a computer, according to another embodiment of the invention.

Referring now to FIG. 2, there is shown a process flow diagram of a method of authenticating a user of a computer, such as PC 110, the method being designated generally by reference numeral 200. Method 200 begins with an authentication initiation step 205, at which the user indicates her desire to be authenticated as an authorized user of PC 110.

Authentication initiation may begin at either the PC 110 or the handheld electronic device 120. At handheld electronic device 120, authentication initiation may begin by selection of a menu item from a menu provided by the user interface or by pressing certain keys. Alternatively, the handheld electronic device 120 may be configured to automatically check whether authentication is to be initiated by periodically polling the serial I/O port.

At PC 110, authentication initiation may begin by pressing a key on the keyboard on PC 110, moving the mouse or otherwise attempting to provide input to PC 110 when it is in its locked state. Usually, a computer will become locked after it is idle for a predetermined period of time, for example in the order of 15 to 30 minutes.

At step 210, the handheld electronic device 120 (or PC 110, depending on whether authentication initiation occurred at the handheld electronic device 120 or PC 110) checks whether communication link 115 has been established. If the communication link 115 has not been established, an error message is provided to the user at step 215 either on the user interface of handheld electronic device 120 or on the display of PC 110.

If the communication link 115 has been established, the user is requested to provide an authorization (or confirmation) input to handheld electronic device 120 at step 220. The authorization input may be either coded or uncoded. For example, a coded form of authorization input may be a user identification code such as a PIN code, a user password or a secure token generated by token generator 150. An uncoded authorization input may be a response such as "yes" or "ok" to a dialog box on the user interface of handheld electronic device 120.

At step 223, the handheld electronic device 120 checks the received authorization input for validity and, if it is not found to be valid (i.e. by comparing it to the access code) at step 225, outputs an error message at step 215. If the authorization input is found to be valid, the handheld electronic device 120 proceeds to access the authentication code in its memory or in the memory of the smart-card or SIM card, at step 230 and transmits the authentication code to PC 110 at step 235.

If an error message is generated at step 215, authentication method 200 halts and awaits authentication initiation step 205 to begin again.

One embodiment of authentication method 200 does not require steps 220, 223 and 225 if handheld electronic device 120 is not configured to require any user input prior to provision of the authentication code to PC 110, for example where the handheld electronic device 120 has already been unlocked by entry of an appropriate user identification code. In such an embodiment, step 230 follows step 210 if the communication link 115 has been established.

Authentication method 200 may alternatively be performed so as to check the establishment of communication link 115 after the authorization input has been requested and validated (steps 220, 225) but before accessing the user authentication code at step 230.

Referring now to FIG. 3, handheld electronic device 120 is described in further detail. Depending on the functionality provided by the handheld electronic device 120, it may be referred to as a data messaging device, a two-way pager, a cellular telephone with data messaging capabilities, a wireless Internet appliance, or a data communication device (with or without telephony capabilities).

Handheld electronic device 120 comprises a number of components, the controlling component being microprocessor 338. Microprocessor 338 controls the overall operation of the handheld electronic device 120. The hardware and software control functions described above in relation to FIGS. 1A to 1F and FIG. 2 are performed by microprocessor 338.

Communication functions, including data and voice communications, are performed through a communication subsystem 311. In this example implementation of handheld electronic device 120, communication subsystem 311 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood that the communication subsystem 311 is intended to use any other suitable standards that are developed in the future.

Microprocessor 338 also interacts with additional subsystems such as a Random Access Memory (RAM) 326, a non-volatile memory 324, a display 322, an auxiliary input/output (I/O) subsystem 328, a serial port 330, a keyboard 332, a communication subsystem 311, a speaker and microphone 336 (which may be separately controlled) and short-range communications 340.

Some of the subsystems of handheld electronic device 120 perform communication-related functions, whereas other subsystems may provide "resident" or on-device functions. By way of example, display 322 and keyboard 332 may be used for both communication-related functions, such as entering a text message for transmission over a network and device-resident functions such as a calculator or task list. Operating system software used by microprocessor 338 is typically stored in a persistent store such as non-volatile memory 324, which may alternatively be a read-only memory (ROM) or similar storage element (not shown). Those skilled in the art will appreciate that the operating system, specific device applications, or parts thereof, may be temporarily loaded into a volatile store such as RAM 326.

Handheld electronic device 120 may require a SIM card 316 to be inserted in a SIM interface 318 in order to communicate with a network. SIM card 316 is one type of a conventional smart-card used to identify a subscriber of handheld electronic device 120 and to personalize the handheld electronic device 120, among other functions. By inserting SIM card 316 into SIM interface 318, a subscriber can access all subscribed services in a network. Services may include: web browsing and messaging such as email, voice mail, Short Message Service (SMS), and Multimedia Messaging Services (MMS). More advanced services may include: point of sale, field service and sales force automation. SIM card 316 includes a processor and memory for storing information.

Once SIM card 316 is inserted in SIM interface 318, it is coupled to microprocessor 338. In order to identify the subscriber, SIM card 316 contains some user parameters such as an International Mobile Subscriber Identity (IMSI) and encryption/decryption keys. SIM card 316 may store additional subscriber information for a mobile device as well, including datebook (or calendar) information and recent call information.

Handheld electronic device 120 is a battery-powered device and includes a battery interface (not shown) for receiving one or more rechargeable batteries (not shown). The battery interface is coupled to a regulator (not shown), which assists the batteries in providing power to handheld electronic device 120. Although current technology makes use of a battery, future technologies such as micro fuel cells may provide the power to handheld electronic device 120.

Microprocessor 338, in addition to its operating system functions, enables execution of software applications on handheld electronic device 120. A set of applications which control basic device operations, including data and voice communication applications, will normally be installed on handheld electronic device 120 during its manufacture. Another application that may be loaded onto handheld electronic device 120 is a personal information manager (PIM). A PIM has functionality to organize and manage data items of interest to a subscriber, such as, but not limited to, e-mail, calendar events, voice mails, appointments, and task items.

Short-range communications subsystem 340 provides for communication between handheld electronic device 120 and different systems or devices, such as PC 110. For example, subsystem 340 may include an infrared device and associated circuits and components for short-range communication. Examples of short range communication include standards developed by the Infrared Data Association (IrDA), Bluetooth, and the 802.11 family of standards developed by IEEE.

Handheld electronic device 120 also includes a card slot 350 for receiving smart-card 130 therein. Microprocessor 338 communicates with a processor on smart-card 130 to access the authentication code stored thereon (for embodiments of the invention using a smart-card). Card slot 350 includes electrical contacts (not shown) for connecting with corresponding electrical contacts on a smart-card 130 to enable communication between microprocessor 338 and the processor on smart-card 130.

Depending on the functions and configuration of handheld electronic device 120, handheld electronic device 120 may include both a SIM card 316 and a smart-card 130. Alternatively, the handheld electronic device 120 may include only one or neither of SIM card 316 and smart-card 130. If neither SIM card 316 or smart-card 130 is received by handheld electronic device 120, the authentication code must be stored in non-volatile memory 324 or other secure memory (not shown) or be accessible to the handheld electronic device 120 from an external source (for example, over a cable 135 as shown in FIG. 1D). If smart-card 130 is received in smart-card slot 350, microprocessor 338 will generally seek to access the authentication code on the smart-card 130. Otherwise, microprocessor 338 will seek to access the authentication code on SIM card 316 (if present).

If token generator 150 is used to generate a token to authenticate the user to the handheld electronic device 120, the authentication code (for authenticating the user to the PC 110) is preferably stored in non-volatile memory 324 or other secure memory. Alternatively, the authentication code may be stored on the smart-card 130 or SIM card 316 (if present). The software algorithm for generating a corresponding token is also stored in non-volatile memory 324.

Microprocessor 338 runs software (stored in non-volatile memory 324) for providing the user interface of handheld electronic device 120. Display 322 and keyboard 332, together with auxiliary input/output 328 (including, for example, a mouse, touch pad, roller selector or rocker switch), are employed in concert with the user interface software to provide full user interface functionality to handheld electronic device 120.

It should be understood that some variation and modification of the described embodiments may be made by persons skilled in the art, without departing from the spirit and scope of the invention, and all such variations and modifications are intended to fall within the scope of the invention, as defined by the appended claims.

The invention claimed is:

1. A method of authenticating a user of a computer, the method comprising:
   providing a handheld electronic device comprising a token generator incorporated into the handheld electronic device, the token generator configured to generate a secure identification token as a first authentication code at the handheld electronic device using an algorithm and objective criterion, the handheld electronic device requiring a second authentication code for use thereof;
   receiving the second authentication code at the handheld electronic device;
   authenticating the second authentication code;
   automatically generating the secure identification token at the handheld electronic device as the first authentication code in response to successfully authenticating the second authentication code; and
   transmitting the first authentication code from the handheld electronic device to the computer over a communication link therebetween to authenticate the handheld electronic device to the computer, the first authentication code for comparison at the computer with a token generated locally on the computer, wherein the token generated locally on the computer is generated according to the algorithm and the objective criterion used to generate the secure identification token at the handheld electronic device.

2. The method of claim 1, wherein the handheld electronic device is received in a cradle and the communication link is established between the computer and the handheld electronic device through the cradle.

3. The method of claim 1, wherein the communication link is formed directly between an I/O port of the computer and an I/O port of the handheld electronic device.

4. The method of claim 3, wherein the communication link is a wireless communication link.

5. The method of claim 3, wherein the communication link comprises a serial cable or USB cable.

6. The method of claim 1, further comprising:
   receiving the second authentication code; and
   authenticating the second authentication code.

7. The method of claim 1, further comprising:
   requesting user confirmation input prior to transmitting the first authentication code.

8. The method of claim 7, wherein the user confirmation input comprises the second authentication code.

9. The method of claim 7, wherein the user confirmation input comprises an uncoded input.

10. The method of claim 8, further comprising:
    receiving the second authentication code; and
    checking the validity of the second authentication code.

11. The method of claim 10, wherein the checking comprises comparing the second authentication code with an access code for accessing the first authentication code.

12. The method of claim 11, wherein the access code is stored in a memory of the handheld electronic device or in a separate memory accessible to the handheld electronic device.

13. The method of claim 11, wherein the access code is generated according to at least one objective criterion.

14. The method of claim 11, wherein the requesting, receiving and checking are performed by the handheld electronic device.

15. The method of claim 11, wherein the requesting and receiving are performed by the computer and the received second authentication code is transmitted from the computer to the handheld electronic device over the communication link prior to the checking.

16. A hand held electronic device comprising:
    a token generator incorporated into the handheld electronic device, the token generator configured to generate a secure identification token as a first authentication code at the hand held electronic device using an algorithm and objective criterion;
    means for receiving a second authentication code of the user at the handheld electronic device;
    communication means for communicating between the handheld electronic device and a computer; and
    processor means configured to authenticate the second authentication code, to automatically generate the secure identification token at the handheld electronic device as the first authentication code in response to successfully authenticating the second authentication code, and to provide the first authentication code to the computer via the communication means to authenticate the handheld electronic device to the computer, the first authentication code for comparison at the computer with a token generated locally on the computer, wherein the token generated locally on the computer is generated according to the algorithm and the objective criterion used to generate the secure identification token at the handheld electronic device.

17. The device of claim 16, wherein the means for receiving comprises a user interface of the handheld electronic device.

18. The device of claim 17, wherein the processor means is configured to control the user interface to request confirmation input prior to providing the first authentication code to the computer.

19. The device of claim 18, wherein the user confirmation input comprises the second authentication code.

20. The device of claim 18, wherein the user confirmation input comprises an uncoded input.

21. The device of claim 19, wherein the processor means is configured to receive the confirmation input and to compare the second authentication code with an access code for accessing the first authentication code.

22. The device of claim 21, wherein the access code is stored in a memory of the handheld electronic device or in a separate memory accessible to the handheld electronic device.

23. The device of claim 21, wherein the access code is generated by the processor means according to at least one objective criterion.

24. The device of claim 16, wherein the means for receiving comprises a communication port of the handheld electronic device and the second authentication code is received from the computer via the communication means.

25. The device of claim 16, wherein the handheld electronic device is receivable in a cradle so that a communication link can be established between the computer and the handheld electronic device through the cradle.

26. The device of claim 16, wherein a communication link is formed directly between an I/O port of the computer and an I/O port of the handheld electronic device.

27. The device of claim 26, wherein the communication link is a wireless communication link.

28. The device of claim 26, wherein the communication link comprises a serial cable or USB cable.

29. The device of claim 17, wherein the processor means is connected to the user interface and configured to receive the second authentication code from the means for receiving for authentication thereof.

30. A computer readable storage medium having stored thereon computer program instructions which, when executed by a computer processor of a handheld electronic device, cause the handheld electronic device to perform a method for authenticating a user of a computer, wherein the handheld electronic device comprises a token generator incorporated into the handheld electronic device, the token generator configured to generate a secure identification token as an authentication code at the handheld electronic device using an algorithm and objective criterion, and wherein the method comprises:

receiving a personal identification code at the handheld electronic device;

authenticating the personal identification code;

establishing a communication link between the handheld electronic device and the computer;

automatically generating the secure identification token at the handheld electronic device as the authentication code in response to successfully authenticating the personal identification code; and providing the authentication code from the handheld electronic device to the computer over the communication link to authenticate the handheld electronic device to the computer, the authentication code for comparison at the computer with a token generated locally on the computer, wherein the token generated locally on the computer is generated according to the algorithm and the objective criterion used to generate the secure identification token at the handheld electronic device.

31. A system for authenticating a user of a computer, comprising:

a handheld electronic device comprising a token generator incorporated into the handheld electronic device, the token generator configured to generate a secure identification token as an authentication code at the handheld electronic device using an algorithm and objective criterion;

means for receiving a personal identification code at the handheld electronic device; and a communication link between the handheld electronic device and the computer;

wherein the handheld electronic device is configured to receive the personal identification code, authenticate the personal identification code, automatically generate the secure identification token at the handheld electronic device as the authentication code in response to successfully authenticating the personal identification code, and provide the authentication code to the computer over the communication link to authenticate the handheld electronic device to the computer, the authentication code for comparison at the computer with a token generated locally on the computer, wherein the token generated locally on the computer is generated according to the algorithm and the objective criterion used to generate the secure identification token at the handheld electronic device.

32. The system of claim 31, wherein the means for receiving comprises a user interface of the handheld electronic device.

33. The system of claim 31, wherein the means for receiving comprises a communication port of the handheld electronic device and the personal identification code is received from the personal computer over the communication link.

* * * * *